(12) United States Patent
Haehner et al.

(10) Patent No.: US 7,484,771 B2
(45) Date of Patent: Feb. 3, 2009

(54) ADJUSTABLE BRACKET

(75) Inventors: Rainer Haehner, Scharbeutz (DE); Axel Mummert, Stockelsdorf (DE)

(73) Assignee: Dräger Medical AG & Co. KG, Lübeck (DE)

( * ) Notice: Subject to any disclaimer, the term of this patent is extended or adjusted under 35 U.S.C. 154(b) by 15 days.

(21) Appl. No.: 11/680,845

(22) Filed: Mar. 1, 2007

(65) Prior Publication Data

US 2007/0209304 A1    Sep. 13, 2007

(30) Foreign Application Priority Data

Mar. 8, 2006    (DE)    ................ 20 2006 003 655 U

(51) Int. Cl.
  *F16L 27/00*    (2006.01)
(52) U.S. Cl. .................. 285/184; 285/223; 16/300; 16/390; 248/49; 248/65
(58) Field of Classification Search ............ 16/248, 16/250, 271, 300, 301, 390, 386, 387; 285/368, 285/261, 371, 423, 915, 285.1, 121.1, 336, 285/184, 223; 174/480, 481, 503, 68.1, 68.3, 174/53, 10; 52/69; 361/825; 156/330; 248/65, 248/49

See application file for complete search history.

(56) References Cited

U.S. PATENT DOCUMENTS

| | | | | |
|---|---|---|---|---|
| 4,445,299 A | * | 5/1984 | Lehikoinen et al. ........... 49/167 |
| 4,550,891 A | * | 11/1985 | Schaty ..................... 248/68.1 |
| 5,234,185 A | * | 8/1993 | Hoffman et al. .............. 248/56 |
| 5,358,352 A | * | 10/1994 | Klarhorst .................. 403/104 |
| 5,464,179 A | * | 11/1995 | Ruckwardt ................. 248/68.1 |
| 5,466,036 A | * | 11/1995 | Stroeters et al. ............. 296/208 |
| 5,665,936 A | * | 9/1997 | Sawamura et al. ............ 174/32 |
| 5,727,960 A | * | 3/1998 | Zehrung .................... 439/165 |
| 5,820,048 A | * | 10/1998 | Shereyk et al. ............. 248/68.1 |
| 6,308,921 B1 | * | 10/2001 | Borzucki ................... 248/68.1 |
| 6,641,093 B2 | * | 11/2003 | Coudrais ..................... 248/73 |
| 6,812,407 B1 | * | 11/2004 | Opperman .................. 174/100 |
| 6,866,300 B2 | * | 3/2005 | Hayes et al. ............. 285/124.2 |
| 6,951,324 B2 | * | 10/2005 | Karamanos ................ 248/68.1 |
| 2002/0112320 A1 | * | 8/2002 | Hayashi ..................... 16/386 |

FOREIGN PATENT DOCUMENTS

DE    10353471 A1    6/2005

* cited by examiner

*Primary Examiner*—Michael Cleveland
*Assistant Examiner*—Joshua Ihezie
(74) *Attorney, Agent, or Firm*—McGlew & Tuttle, P.C.

(57) ABSTRACT

An adjustable bracket is provided with profiled parts (2, 3), a hinge (4) between the profiled parts (2, 3) and with a duct (7, 8) for accommodating media lines (9). The duct (7, 8) is formed of a flexible material. A fastening device (5, 6) for the duct (7, 8) is present on the top side and/or the underside of the profiled parts (2, 3) in such a way that it can be guided over the hinge (4).

15 Claims, 3 Drawing Sheets

ADJUSTABLE BRACKET

CROSS REFERENCE TO RELATED APPLICATIONS

This application claims the benefit of priority under 35 U.S.C. §119 of German Patent Application DE 20 2006 003 655.5 filed Mar. 8, 2006, the entire contents of which are incorporated herein by reference.

FIELD OF THE INVENTION

The present invention pertains to an adjustable bracket with profiled parts, a hinge between the profiled parts and a duct for accommodating media lines.

BACKGROUND OF THE INVENTION

A bracket of the type has become known from DE 103 53 471 A1. The prior-art bracket comprises two hollow profile sections, which are connected to one another via a hinge. The hollow profile sections have wall parts, which are connected in a U-shaped manner, are open toward the underside and whose free ends are connected to one another via a likewise U-shaped closing cover. The closing cover is used to open and close the hollow profile in order to accommodate media lines there. The media lines normally extend on the underside of the hollow profile. When media lines are replaced, the closing covers are first pulled off from the wall parts downwardly and subsequently fastened again to the wall parts by means of a snap connection. Different media lines can thus be fastened and rapidly replaced along the hollow profiles.

The drawback of the prior-art bracket is that there is no cable routing in the area of the hinge.

SUMMARY OF THE INVENTION

The basic object of the present invention is to provide a bracket with improved cable routing in the area of a hinge.

According to the invention, an adjustable bracket is provided with profiled parts, a hinge between the profiled parts and with a duct for accommodating media lines. The duct is formed of a flexible material. A fastening means is provided for fastening the duct on a top side and/or on an underside of the profiled parts in such a way that the duct can be guided over the hinge.

The bracket described of the present invention is preferably used to hold medical products, such as monitoring devices or measuring devices, where supply lines must be routed and fastened along the bracket. It is important in this connection to enable the monitoring devices to be replaced in a simple manner and that the media lines can be removed in a simple manner in the process. In addition, the media lines, which are exposed especially to mechanical stress in the area of the bracket, shall be protected from damage.

Provisions are made according to the present invention for the media lines to be accommodated in a duct made of a flexible material and for fastening means to be present for the duct on the top side or on the underside of the profiled parts of the bracket in such a way that the duct can be guided via the hinge. Due to the flexibility of the duct, the bracket can thus be pivoted in the area of the hinge without the range of pivoting being appreciably compromised by the duct.

It is especially advantageous here to make the duct as a slotted flexible tubing made of silicone, into which the media lines can be inserted on the side. The hinge has such a height that the duct can be guided beyond the hinge over the entire length of the bracket.

It is especially advantageous to select a duct with an essentially circular cross-sectional profile. It was found that such ducts possess especially good deformation properties in the area of the hinge.

To fasten the duct to the profiled parts, depressions are provided on the top side and on the underside, and the duct can be inserted into these depressions. It is especially advantageous in this connection to fasten the duct in the depressions by means of a snap closure. Undercuts are provided according to the present invention as snap closures in the area of the depressions, and the ducts have projecting lugs, which snap into the undercuts. The ducts may be arranged either on the top side of the bracket or on the underside of the bracket or they extend both on the top side and on the underside.

An exemplary embodiment of the present invention is shown in the figures and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
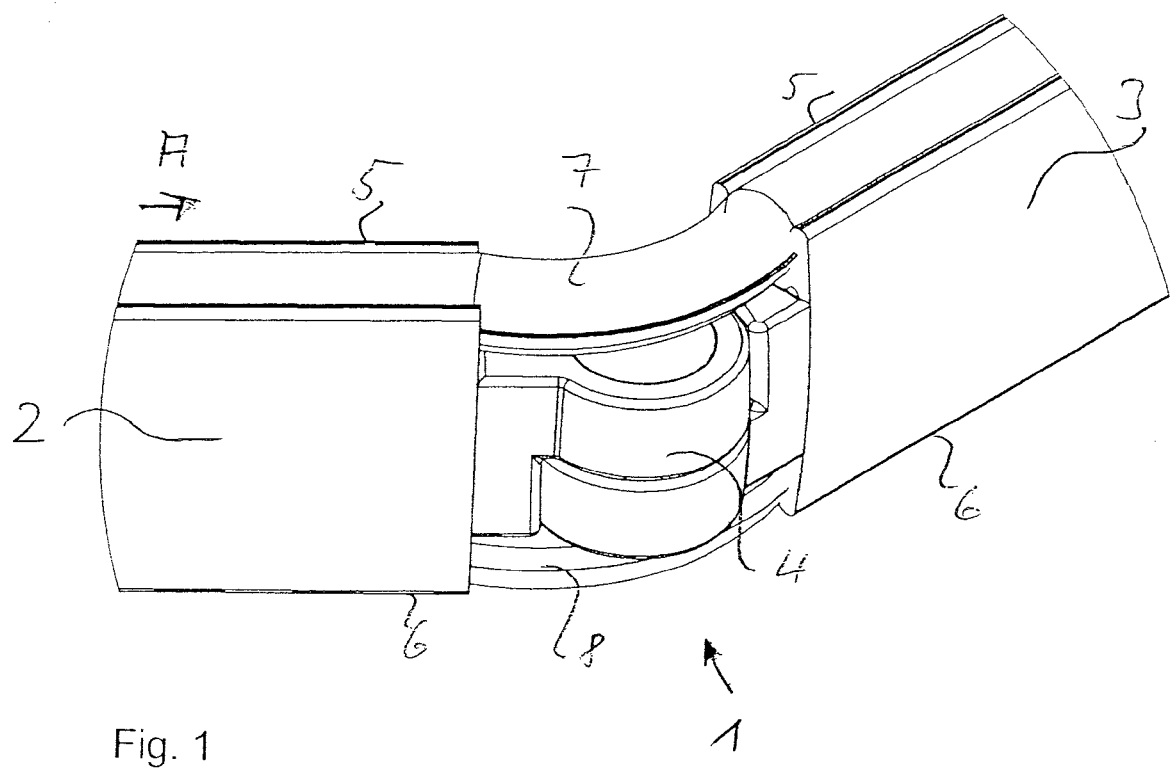
FIG. 1 is a schematic perspective view of a bracket according to the invention.

Referring to the drawings in particular, FIG. 1 schematically illustrates a bracket 1 with two profiled parts 2, 3, which are connected to one another pivotably via a hinge 4. The profiled parts 2, 3 have depressions 5, 6 on the top side and the underside for accommodating flexible cable ducts 7, 8. The hinge 4 has such a height that the cable ducts 7, 8 can extend beyond the hinge 4 from one profiled part 2 to the adjacent profiled part 3.

Figure 2:
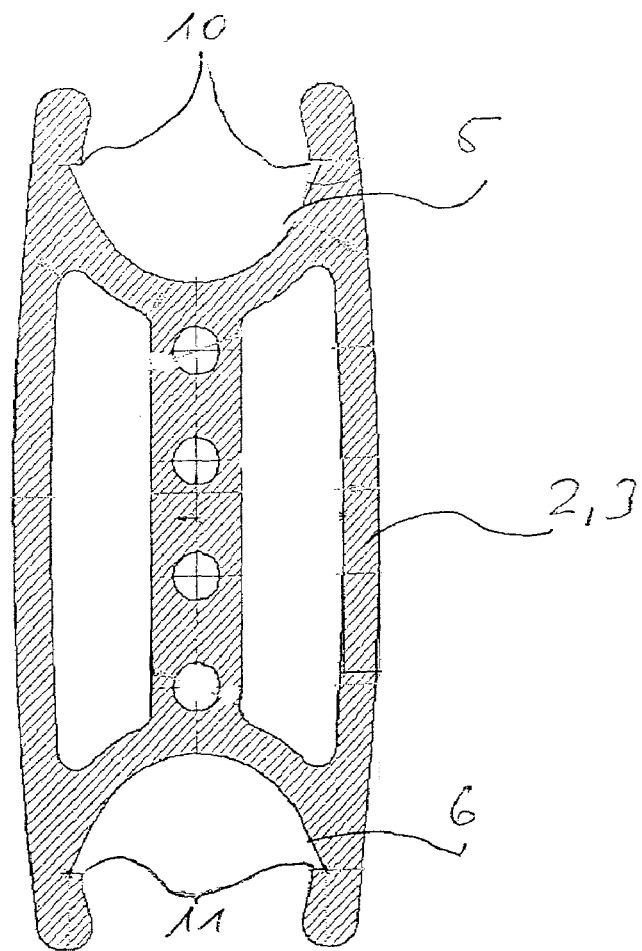
FIG. 2 is a longitudinal sectional view through the bracket according to FIG. 1.

FIG. 2 shows a longitudinal section of the profiled parts 2, 3.

The profiled parts 2, 3 have semicircular depressions 5, 6 with undercuts 10, 11 on both the top side and on the underside for accommodating the cable ducts 7, 8.

Figure 3:
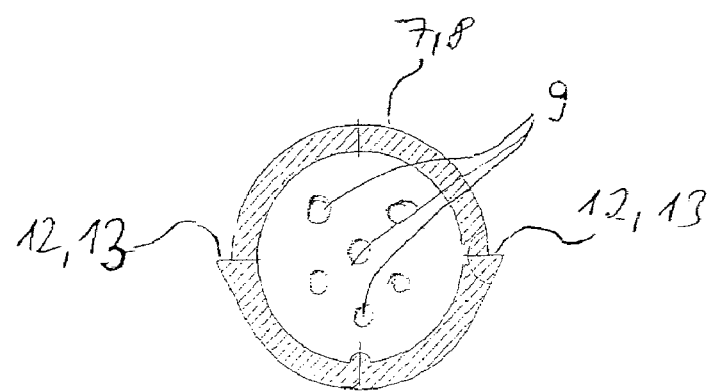
FIG. 3 is a longitudinal sectional view of a duct for accommodating media lines.

FIG. 3 shows the longitudinal section of one of the cable ducts 7, 8. Media lines 9 are located in the middle of the cable ducts 7, 8. The cable ducts 7, 8 have projecting lugs 12, 13 located opposite each other.

Figure 4:
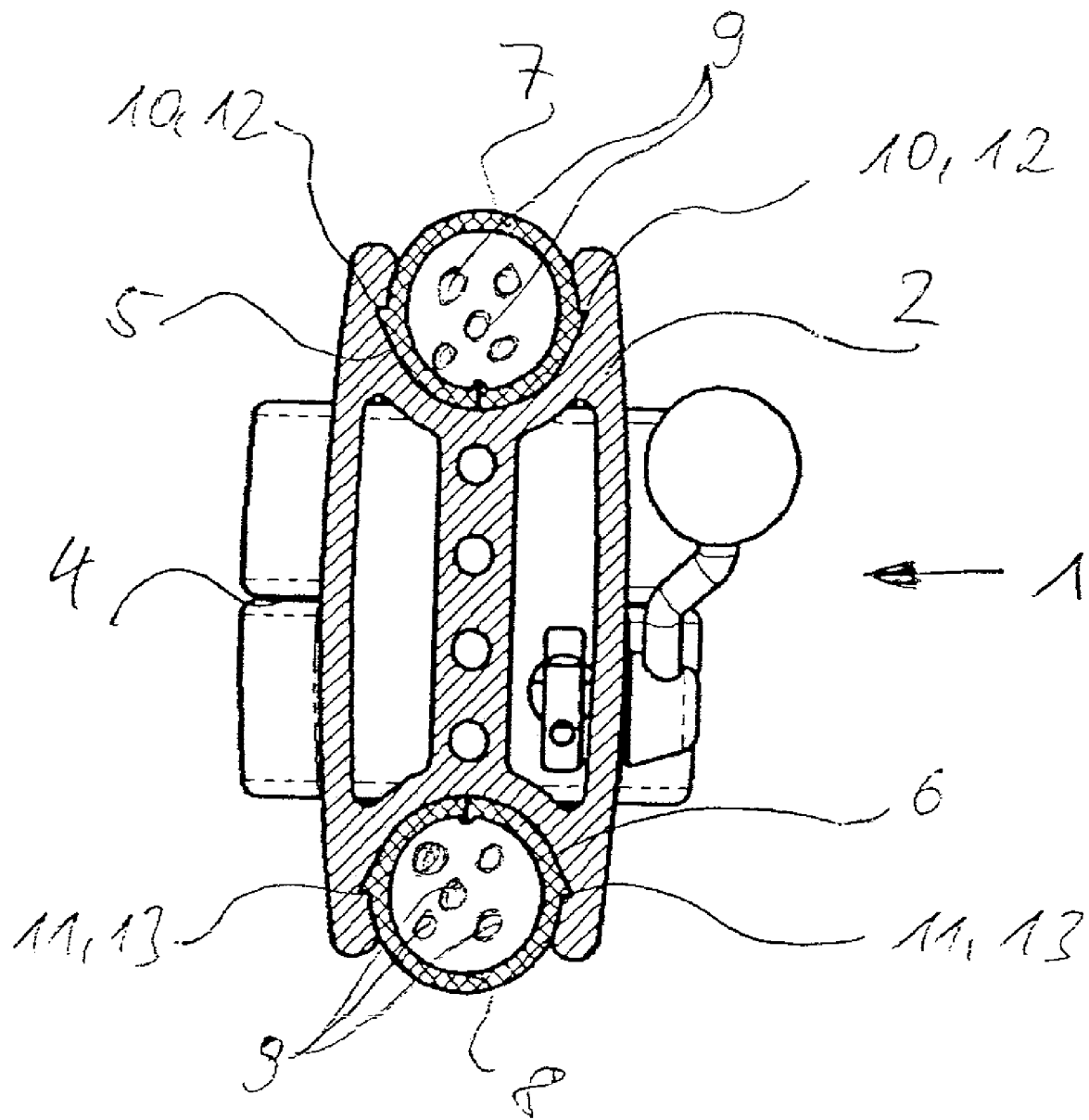
FIG. 4 is a bracket with ducts on the top side and on the underside in the direction of view A according to FIG. 1.

When the cable ducts 7, 8 are pressed into the depressions 5, 6, the lugs 12, 13 snap into the undercuts 10, 11, as can be determined from FIG. 4. The lugs 12, and the undercuts 10, form a fastening means and the lugs 13 and the undercuts 11, form a fastening means.

FIG. 4 shows the longitudinal section of the bracket 1 in the direction of view according to FIG. 1.

While specific embodiments of the invention have been shown and described in detail to illustrate the application of the principles of the invention, it will be understood that the invention may be embodied otherwise without departing from such principles.

What is claimed is:

1. An adjustable bracket, comprising:
   profiled parts, each profiled part having a profiled part surface defining a duct receiving recess;
   a hinge between said profiled parts;
   a duct for accommodating media lines, said duct being formed of a flexible material; and
   fastening means for fastening said duct on a top side and/or an underside of said profiled parts in such a way that said duct is guided over said hinge, said fastening means comprising a first lug located on one side of said duct, a second lug located on another side of said duct, a first undercut located on one side of said duct receiving recess of each said profiled part and a second undercut located on another side of said duct receiving recess of each said profiled part, said first lug and said second lug being flexible to generate a snap in retaining function as said duct is moved into said duct receiving recess and is seated in said profiled part surface of each profiled part.

2. An adjustable bracket in accordance with claim 1, wherein said duct has an essentially circular cross-sectional profile.

3. An adjustable bracket in accordance with claim 1, wherein said duct receiving recess is located on the underside and/or the top side of said profile parts.

4. An adjustable bracket in accordance with claim 3, wherein said first lug, said second lug, said first undercut and said second undercut extend in a radial direction.

5. An adjustable bracket in accordance with claim 1, further comprising another hinge and a further profiled part to form a pivot combination, wherein said pivot combination is pivotable in two planes.

6. An adjustable bracket in accordance with claim 1, wherein said first lug is in contact with said first undercut and said second lug is in contact with said second undercut.

7. An adjustable bracket in accordance with claim 6, wherein said duct is in contact with said profiled part surface of each profiled part.

8. An adjustable bracket, comprising:
   a profiled part having a duct receiving space;
   another profiled part having a duct receiving space;
   a hinge located between said profiled part and said another profiled part;
   a duct for accommodating lines, said duct being formed of a flexible material; and
   fastening means for fastening said duct to a side of said profiled part and a side of said another profiled part and to support said duct passing over said hinge located between said profiled part and said another profiled part, said fastening means comprising a first lug located on one side of said duct, a second lug located on another side of said duct, a first side undercut and a second side undercut associated with said duct receiving space of said profiled part and a first side undercut and a second side undercut associated with said duct receiving space of said another profiled part.

9. An adjustable bracket in accordance with claim 8, wherein said duct has an essentially circular cross-sectional profile.

10. An adjustable bracket in accordance with claim 8, wherein said duct receiving space of said profile part and said duct receiving space of said another profile part are located on the underside and/or the top side of said profiles for accommodating said duct.

11. An adjustable bracket in accordance with claim 10, wherein said first lug and said second lug of said duct generate a snap in retaining function as duct is moved into said duct receiving recess of said profiled part and said duct receiving recess of said another profiled part.

12. An adjustable bracket in accordance with claim 8, further comprising another hinge and a further profiled part to form a pivot combination, wherein said pivot combination is pivotable in two planes.

13. An adjustable bracket in accordance with claim 8, wherein said first lug of said duct is in contact with said first undercut of said profiled part, said second lug of said duct engaging said second undercut of said profiled part, said first lug of said duct being in contact with said first undercut of said another profiled part, said second lug of said duct engaging said second undercut of said another profiled part.

14. An adjustable bracket in accordance with claim 8, wherein said first lug and said second lug are flexible to generate a snap in retaining function as said duct moves into said duct receiving space of said profiled part and said duct receiving space of said another profiled part.

15. An adjustable bracket, comprising:
   a first profiled part with a side having a duct receiving depression;
   a second profiled part with a side having a duct receiving depression;
   a hinge connected between said first profiled part and said second profiled part;
   a flexible duct accommodating lines; and
   fastening means for retaining said duct in said first profiled part duct receiving depression and for retaining said duct in said second profiled part duct receiving depression and to support said duct passing over said hinge connected between said first profiled part and said second profiled part, said fastening means comprising a fixing structure on said duct cooperating with a fixing structure associated with said duct receiving depression of said first profiled part and with a fixing structure associated with said duct receiving depression of said second profiled part, said fixing structure on said duct comprising first side and second side snap connection lugs, said fixing structure associated with said duct receiving depression of said first profiled part including first side and second side snap connection undercuts, said fixing structure associated with said duct receiving depression of said second profiled part including first side and second side snap connection undercuts.

* * * * *